(12) United States Patent
Arning et al.

(10) Patent No.: US 7,529,727 B2
(45) Date of Patent: May 5, 2009

(54) USING AN INDEX TO ACCESS A SUBJECT MULTI-DIMENSIONAL DATABASE

(75) Inventors: Andreas Arning, Rottenburg (DE); William E. Malloy, Santa Clara, CA (US); Gary Robinson, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 09/747,515

(22) Filed: Dec. 21, 2000

(65) Prior Publication Data

US 2001/0054034 A1      Dec. 20, 2001

Related U.S. Application Data

(63) Continuation of application No. 09/564,344, filed on May 4, 2000.

(51) Int. Cl.
  *G06F 17/30*      (2006.01)

(52) U.S. Cl. .................. 707/2; 707/3; 707/E17.057; 707/102

(58) Field of Classification Search .............. 707/2–6, 707/100, 102, 103, 104.1; 345/713, 810, 345/828, 975
See application file for complete search history.

(56) References Cited

U.S. PATENT DOCUMENTS

| | | | | |
|---|---|---|---|---|
| 5,231,577 A | * | 7/1993 | Koss ........................ | 345/440 |
| 5,233,513 A | | 8/1993 | Doyle | |
| 5,325,445 A | * | 6/1994 | Herbert .................... | 382/225 |
| 5,359,724 A | | 10/1994 | Earle | |
| 5,371,675 A | | 12/1994 | Greif et al. | |
| 5,418,898 A | * | 5/1995 | Zand et al. ............... | 707/503 |
| 5,647,058 A | * | 7/1997 | Agrawal et al. ........... | 707/1 |
| 5,680,618 A | | 10/1997 | Freund | |
| 5,721,910 A | | 2/1998 | Unger et al. | |
| 5,727,199 A | * | 3/1998 | Chen et al. ............... | 707/5 |
| 5,778,354 A | | 7/1998 | Leslie et al. | |
| 5,778,355 A | | 7/1998 | Boyer et al. | |
| 5,805,885 A | | 9/1998 | Leach et al. | |
| 5,819,270 A | | 10/1998 | Malone et al. | |
| 5,864,857 A | * | 1/1999 | Ohata et al. ............... | 707/100 |
| 5,890,151 A | | 3/1999 | Agrawal et al. | |
| 5,905,985 A | | 5/1999 | Malloy et al. | |

(Continued)

FOREIGN PATENT DOCUMENTS

JP      8263566      10/1996

(Continued)

OTHER PUBLICATIONS

Ho et al., Range Queries in OLAP Data Cubes, 1997, ACM, pp. 73-88.*

(Continued)

*Primary Examiner*—Leslie Wong
(74) *Attorney, Agent, or Firm*—Konrad Raynes & Victor LLP; Janaki K. Davda

(57) ABSTRACT

A technique for accessing a subject multi-dimensional database stored on a data store connected to the computer. An index is created for the subject multi-dimensional database, wherein the index comprises another multi-dimensional database. Then, the subject multi-dimensional database is accessed using the index.

8 Claims, 12 Drawing Sheets

U.S. PATENT DOCUMENTS

| | | | |
|---|---|---|---|
| 5,918,210 A | | 6/1999 | Rosenthal et al. |
| 5,918,232 A | * | 6/1999 | Pouschine et al. ........ 707/103 R |
| 5,926,818 A | | 7/1999 | Malloy |
| 5,926,820 A | | 7/1999 | Agrawal et al. |
| 5,933,796 A | | 8/1999 | Ashida et al. |
| 5,940,818 A | | 8/1999 | Malloy et al. |
| 5,943,668 A | | 8/1999 | Malloy et al. |
| 5,943,677 A | * | 8/1999 | Hicks ......................... 707/205 |
| 5,953,707 A | | 9/1999 | Huang et al. |
| 5,970,482 A | | 10/1999 | Pham et al. |
| 5,978,788 A | | 11/1999 | Castelli et al. |
| 5,978,796 A | * | 11/1999 | Malloy et al. .............. 707/100 |
| 5,995,945 A | | 11/1999 | Notani et al. |
| 6,003,029 A | | 12/1999 | Agrawal et al. |
| 6,003,036 A | * | 12/1999 | Martin ....................... 707/102 |
| 6,011,910 A | | 1/2000 | Chau et al. |
| 6,065,002 A | | 5/2000 | Knotts et al. |
| 6,078,741 A | * | 6/2000 | Ma et al. ...................... 703/24 |
| 6,094,651 A | * | 7/2000 | Agrawal et al. ................ 707/2 |
| 6,108,647 A | | 8/2000 | Poosala et al. |
| 6,122,636 A | | 9/2000 | Malloy et al. |
| 6,134,541 A | * | 10/2000 | Castelli et al. |
| 6,134,563 A | | 10/2000 | Clancey et al. |
| 6,148,295 A | | 11/2000 | Megiddo et al. |
| 6,154,746 A | | 11/2000 | Berchtold et al. |
| 6,167,396 A | | 12/2000 | Lokken |
| 6,182,060 B1 | | 1/2001 | Hedgcock et al. |
| 6,205,447 B1 | * | 3/2001 | Malloy ....................... 707/100 |
| 6,212,515 B1 | | 4/2001 | Rogers |
| 6,212,524 B1 | * | 4/2001 | Weissman et al. ........... 707/101 |
| 6,219,665 B1 | * | 4/2001 | Shiomi .......................... 707/1 |
| 6,278,994 B1 | * | 8/2001 | Fuh et al. ....................... 707/4 |
| 6,285,996 B1 | | 9/2001 | Jou et al. |
| 6,289,354 B1 | * | 9/2001 | Aggarwal et al. |
| 6,317,750 B1 | * | 11/2001 | Tortolani et al. ............ 345/853 |
| 6,366,299 B1 | | 4/2002 | Lanning et al. |
| 6,381,605 B1 | * | 4/2002 | Kothuri et al. .............. 707/100 |
| 6,385,604 B1 | | 5/2002 | Bakalash et al. |
| 6,408,300 B1 | | 6/2002 | Bergman et al. |
| 6,411,313 B1 | | 6/2002 | Conlon et al. |
| 6,438,537 B1 | | 8/2002 | Netz et al. |
| 6,456,949 B1 | | 9/2002 | Yamagajo et al. |
| 6,460,026 B1 | | 10/2002 | Pasumansky |
| 6,480,842 B1 | | 11/2002 | Agassi et al. |
| 6,490,593 B2 | * | 12/2002 | Proctor ....................... 707/102 |
| 6,535,872 B1 | | 3/2003 | Castelli et al. |
| 6,542,895 B1 | * | 4/2003 | DeKimpe et al. ........... 707/101 |
| 6,567,796 B1 | | 5/2003 | Yost et al. |
| 6,578,022 B1 | * | 6/2003 | Foulger et al. ................ 706/45 |
| 6,707,454 B1 | | 3/2004 | Barg et al. |
| 6,735,590 B1 | | 5/2004 | Shoup et al. |
| 6,741,983 B1 | | 5/2004 | Birdwell et al. |
| 7,076,502 B2 | | 7/2006 | Shoup et al. |
| 7,076,742 B1 | | 7/2006 | Thorn et al. |
| 7,181,450 B2 | | 2/2007 | Malloy et al. |
| 7,315,849 B2 | | 1/2008 | Bakalash et al. |
| 2001/0047364 A1 | | 11/2001 | Proctor |
| 2001/0054034 A1 | | 12/2001 | Arning et al. |
| 2002/0029207 A1 | * | 3/2002 | Bakalash et al. ................ 707/1 |
| 2002/0099710 A1 | | 7/2002 | Papierniak |
| 2002/0116213 A1 | | 8/2002 | Kavounis et al. |
| 2002/0149614 A1 | | 10/2002 | Biebesheimer et al. |
| 2002/0184187 A1 | | 12/2002 | Bakalash et al. |
| 2002/0198919 A1 | | 12/2002 | Kelkar |
| 2003/0009649 A1 | | 1/2003 | Martin et al. |
| 2003/0014417 A1 | | 1/2003 | Kelkar |
| 2003/0028546 A1 | | 2/2003 | Keller et al. |
| 2003/0126143 A1 | | 7/2003 | Roussopoulos et al. |
| 2003/0208506 A1 | | 11/2003 | Greenfield et al. |
| 2003/0225752 A1 | | 12/2003 | Bakalash et al. |
| 2004/0034615 A1 | | 2/2004 | Thomson et al. |
| 2004/0059724 A1 | | 3/2004 | Petculescu et al. |
| 2004/0122820 A1 | | 6/2004 | Malloy et al. |
| 2004/0243607 A1 | | 12/2004 | Tummalapalli |
| 2005/0010579 A1 | | 1/2005 | Shoup et al. |
| 2006/0085742 A1 | | 4/2006 | Harold et al. |

FOREIGN PATENT DOCUMENTS

| | | |
|---|---|---|
| JP | 10040050 | 2/1998 |
| JP | 2001022621 | 1/2001 |

OTHER PUBLICATIONS

U.S. Appl. No. 09/500,263, Malloy et al.
U.S. Appl. No. 09/564,344, Malloy et al.
U.S. Appl. No. 09/565,132, Malloy et al.
U.S. Appl. No. 09/998,955, Kelkar et al.
U.S. Appl. No. 09/998,960, Kelkar.
Chester, T. & R.H. Alden, "Mastering Excel 97", 1997, Fourth Edition, Sybex, pp. 6, 463-465, 521-526, and 744-748.
Computergram International, "Information Builders Ready with Fusion Multi-Dimensional Database for Warehousing, Executive Information Systems", May 1996, n. 2917.
Martin, J., K.K.Chapman, & J. Leben, "DB2: Concepts, Design, and Programming", 1989, Prentiss Hall, pp. 204-207.
"Multidimensional Indexing: The R Tree", Spatial Database Management, 454, 1-13.
Oxford University Press, "Dictionary of Computing", 1990, Third Edition, pp. 110-111 & 217-218.
PC Week, "Information Builders erects 'Fusion'", May 1996, Ziff-David Publishing Company, p. 8.
Rennhackkamp, M., "IBM's Intelligent Family: Decision Making Driven by IBM's Business Intelligence Initiative", [online], DBMS online, [Retrieved on Feb. 22, 2005], retrieved from the Internet at <URL:http://www.dbmsmag.com/9808d17.html>.
Chaudhuri, S. & U. Dayal, "An Overview of Data Warehousing and OLAP Technology", [online], Mar. 1997, [retrieved on Mar. 13, 206], retrieved from the Internet at <URL: http://www.cs.sfu.ca/CC/459/han/papers/chaudhuri97.pdf>.
Connor, C. & A. Deseure, "Using OLAP in Database Marketing", *Database and Network Journal*, Apr. 1998, vol. 28, No. 2, pp. 6-8.
Han, J., J. Pei, g. Dong, & K. Wang, "Efficient Computation of Iceberg Cubes with Complex Measures", *Proceedings of the 2001 ACM SIGMOD International Conference on Management of Data*, May 2001, vol. 30, No. 2, Jun. 2001, pp. 1-12.
Kelkar, B., "Exploiting Symbiosis between Data Mining and OLAP for Business Insights", [online], Dec. 2001, [retrieved on Apr. 18, 2006], retrieved from the Internet at <URL: http://dmreview.com/editorial/dmreview/print_action.cfm?articleID=4446>.
Lee, D.H., C.W. Chung & H.J. Kim, "Spherical Pyramid-Technique: An Efficient Indexing Technique for Similarity Search in High-Dimensional Data", *Journal of KISS*, Nov. 1999, vol. 26, No. 11, pp. 1270-1281.
Li, C. & X.S. Wang, "A Data Model for Supporting On-line Analytical Processing", *Proceedings of the Fifth International Conference on Information and Knowledge Management*, Nov. 1996, pp. 81-88.
Lindsey, H., J.T. Mason, & T. Wilson, "Meaningful Viewing of Complex Data Structures", *IBM Technical Disclosure Bulletin*, Aug. 1994, vol. 37, No. 8, pp. 637-638.
"MIS AG Announces Software that Automates and Enhances Business-Intelligence Methods", [online], Aug. 18, 1998, [Retrieved on Dec. 11, 2002], retrieved from the Internet at <URL: http://www.hpcwire.com/dsstar/98/0818/ 100264>.
Pairceir, R., S. McClean, & B. Scotney, "Discovery of Multi-level Rules and Exceptions from a Distributed Database", *Proceedings of the Sixth ACM SIGKDD International Conference on Knowledge Discovery and Data Mining*, 2000, pp. 523-532.
Rotem, D. & J.L. Zhao, "Extendible Arrays for Statistical Databases and OLAP Applicatinos", *Proceedings of the 8th International Conference on Scientific and Statistical Database Systems*, Jun. 1996, pp. 108-117.
Sarawagi, S., "Explaining Differences in Multidimensional Aggregates", *Proceedings of the 25th International Conference on Very Large Data Bases*, Sep. 1999, pp. 42-53.

Sarawagi, S., R. Agrawal, & N. Megiddo, "Discovery-Driven Exploration of OLAP Data Cubes", *Proceedings of the 6th International Conference on Extending Database Technology*, Mar. 1998, pp. 168-182.

Shanmugasundaram, J., U. Fayyad, & P.S. Bradley, "Compressed Data Cubes for OLAP Aggregate Query Approximation on Continuous Dimensions", *Proceedings of the 5th ACM SIGKDD International Conference on Knowledge Discovery and Data Mining*, 1999, pp. 223-232.

Sung, S., S. Huang, & A. Ramer, "Smoothing Over Summary Information in Data Cubes", *Journal of Systems Integration*, vol. 10, No. 1, Nov. 2000, pp. 5-22.

Theodoratos, D. & T. Sellis, "Answering Multidimensional Queries on Cubes Using Other Cubes", *Proceedings of the 12th International Conference on Scientific and Statistical Database Management*, Jul. 2000, pp. 110-122.

Baldwin, J.F. and T.P. Martin, "Uncertainty Handling in Real-World Applications of Data Mining", Proceedings of the 3rd International Conference on the Practical Application of Knowledge Discovery and Data Mining, Apr. 1999, pp. 1-18.

De Ville, B., "Data Mining Best Practices: Lessons Learned in Process, Applications and Techniques", Proceedings of the 3rd International Conference on the Practical Application of Knowledge Discovery and Data Mining, Apr. 1999, pp. 19-20.

Goil, S. and A. Choudhary, "A Parallel Scalable Infrastructure for OLAP and Data Mining", Proceedings of the International Database Engineering and Applications Symposium, Aug. 1999, pp. 178-186.

Graco, W., "Some Developments in the Use of Smart Technology in Health Care and Administration", Proceedings of the 3rd International Conference on the Practical Application of Knowledge Discover and Data Mining, Apr. 1999.

Harris-Jones, C., "Integrating Data Mining into Business Intelligence", Proceedings of the 3rd International Conference on the Practical Application of Knowledge Discovery and Data Mining, Apr. 1999, pp. 21-22.

Legakis, L., J. Nugent, D.G. Bowen, and J. Bowen, "Intelligent Subject Matter Classification and Retrieval", Proceedings of the 1993 Canadian Conference on Electrical and Computer Engineering, Sep. 1993, vol. I, 1-35.

Richeldi, M., "A Business Intelligence Solution for Energy Budget Control", Proceedings of the 3rd International Conference on the Practical Application of Knowledge Discovery and Data Mining, Apr. 1999, pp. 167-182.

Sarawagi, S., "Indexing OLAP Data 0", Bulletin of the IEEE Computer Society Technical Committee on Data Engineering, 1996, pp. 1-9.

Sharman, R., "Improved Segmentation for Data Analysis", IBM Technical Disclosure Bulletin, vol. 40, No. 8, Aug. 1997, pp. 145-154.

Sokol, L. "Insuring the Success of Commercial Data Mining Projects", Proceedings of the 3rd International Conference on the Practical Application of Knowledge Discovery and Data Mining, Apr. 1997, pp. 23-28.

Goil, S. and A. Choudhary, "Sparse Data Storage of Multi-Dimensional Data for OLAP and Data Mining", Technical Report CPDC-TR-9801-005, Northwestern University, 1998, 26 pp.

Sarawagi, S., R. Agrawal, & N. Megiddo, "Discovery-Driven Exploration of OLAP Data Cubes", IBM Research Report, Jan. 1998, pp. 1-28.

\* cited by examiner

| | | Florida | Measures<br>100-10<br>Utah | Scenario<br>Market | Florida | 400-10<br>Utah | Market | Product<br>Florida | Utah | Market |
|---|---|---|---|---|---|---|---|---|---|---|
| Rank | Year | 0 | - | - | - | - | - | - | - | - |
| Rank 1 | Jan | 0.06 | - | - | - | - | - | - | - | - |
| Eank 2 | Qtr2 | - | - | - | - | - | - | - | 0.03 | - |
| Rank 3 | Nov | - | - | - | - | - | 0.02 | - | - | - |

| | Scenario | Market | Product | Year | Rank | Measures |
|---|---|---|---|---|---|---|
| | | | | | | 0 |
| | Actual | Florida | 100-10 | Jan | Rank 1 | 0.06 |
| | Actual | Utah | Product | Qtr2 | Eank 2 | 0.03 |
| | Actual | Market | 400-10 | Nov | Rank 3 | 0.02 |

— 902
— 903
— 904

FIG. 9B
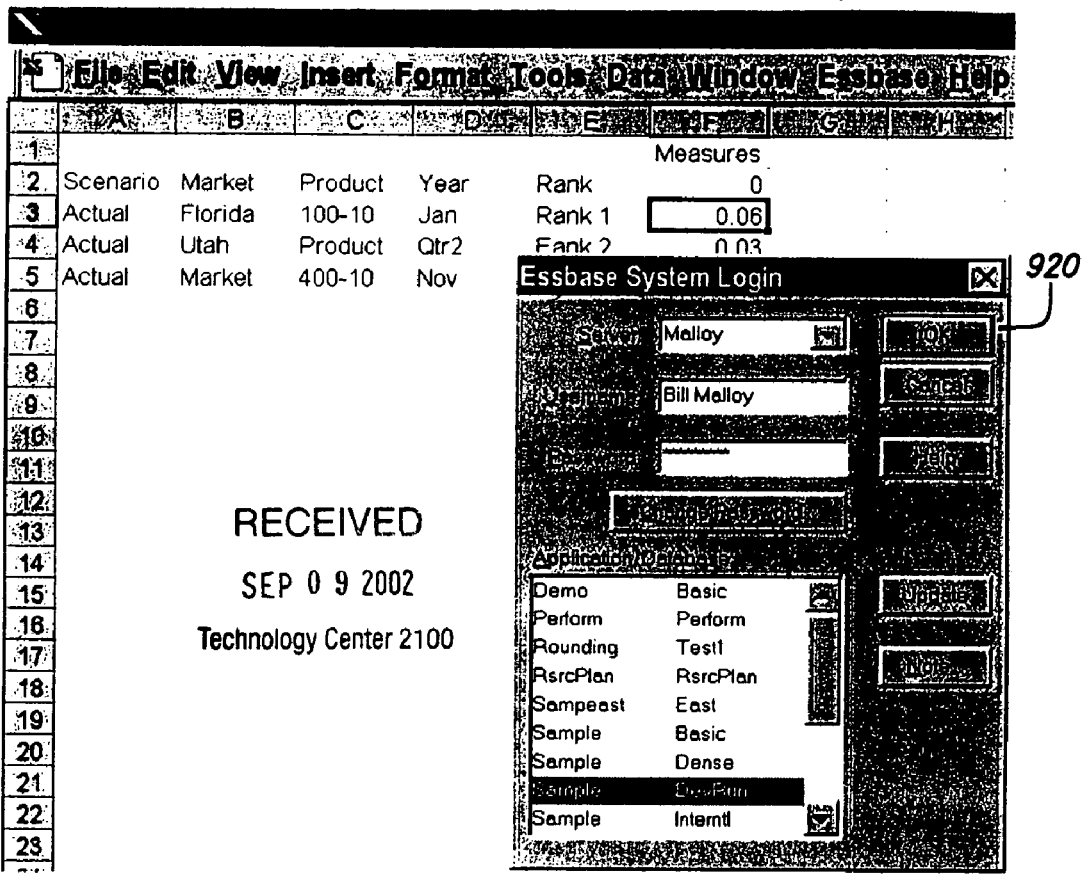
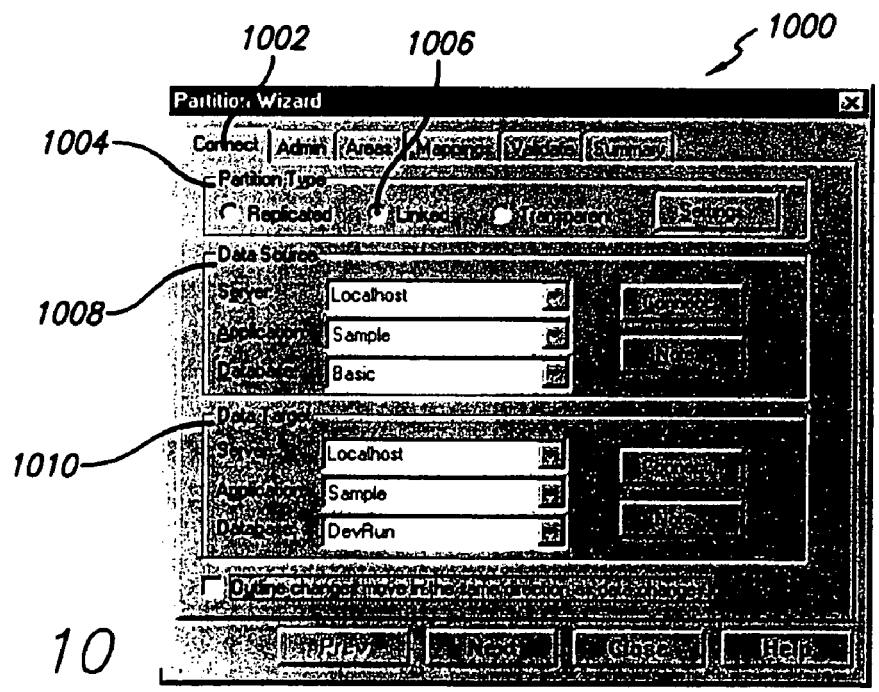
FIG. 10

FIG. 11 $\swarrow^{1100}$

| Source | Target |
|---|---|
| @IDESCENDENTS("Year") | @IDESCENDENTS("Year") @IDESCENDENTS("Rank") |
| <new> | <new> |

FIG. 12 $\swarrow^{1200}$

| Source Member | |
|---|---|
| (void) | "Rank" |
| (void) | "Rank 1" |
| (void) | "Rank 2" |
| (void) | "Rank 3" |
| "Sales" | "Deviation" |
| <new> | <new> |

1202 — points to (void) rows
1204 — points to "Sales" row

FIG. 14 $\swarrow^{1400}$

Linked Objects Browser -- Localhost:Sample:DevRun

1402 — Linked Partition
1404 — Cell Note    Explanation of this deviation    admin

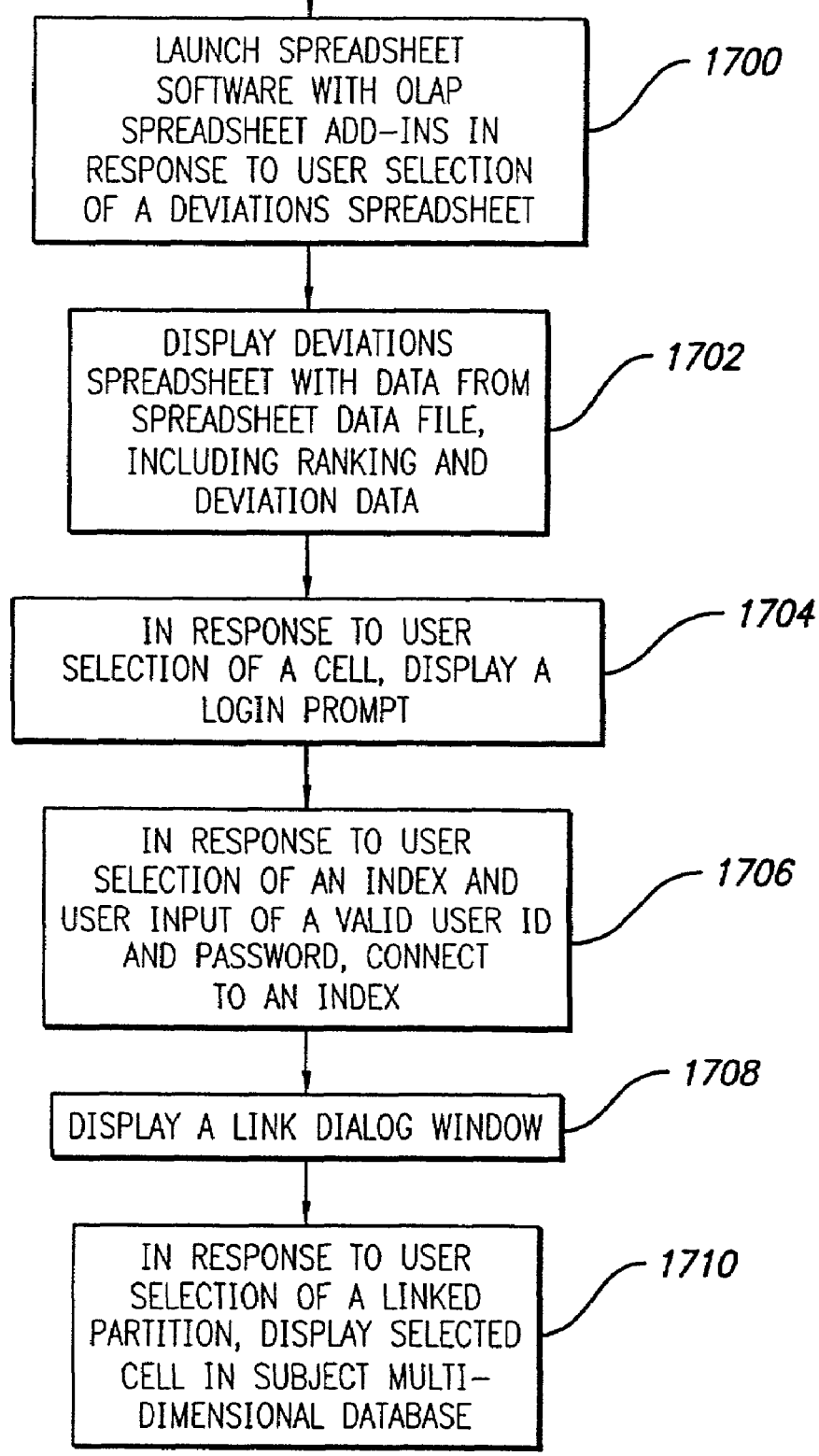

USING AN INDEX TO ACCESS A SUBJECT MULTI-DIMENSIONAL DATABASE

CONTINUATION DATA

This application is related by common inventorship and subject matter and is a continuation of co-pending U.S. patent application Ser. No. 09/564,344, entitled "USING AN INDEX TO ACCESS A SUBJECT MULTI-DIMENSIONAL DATABASE," filed on May 4, 2000, by William E. Malloy, et. al. U.S. patent application Ser. No. 09/564,344 issued as U.S. Pat. No. 6,915,289 on Jul. 5, 2005, and a Statutory Disclaimer was filed for U.S. Pat. No. 6,915,289 on Jan. 10, 2007.

CROSS-REFERENCE TO RELATED APPLICATION

This application is related to the following co-pending and commonly-assigned patent application:

application Ser. No. 09/565,132, entitled "NAVIGATING AN INDEX TO ACCESS A SUBJECT MULTI-DIMENSIONAL DATABASE," filed on same date herewith, by William E. Malloy, et al., which is incorporated by reference herein.

FIELD OF THE INVENTION

This invention relates in general to database management systems performed by computers, and in particular, to using an index to access a subject multi-dimensional database.

BACKGROUND OF THE INVENTION

On-line analytical processing (OLAP) refers to consolidating, viewing, and analyzing data in the manner of "multi-dimensional data analysis." In OLAP systems, data can be aggregated, summarized, consolidated, summed, viewed, and analyzed. OLAP generally comprises numerous, speculative "what-if" and/or "why" data model scenarios executed by a computer. Within these scenarios, the values of key variables or parameters are changed, often repeatedly, to reflect potential variances in measured data. Additional data is then synthesized through animation of the data model. This often includes the consolidation of projected and actual data according to more than one consolidation path or dimension.

Data consolidation is the process of synthesizing data into essential knowledge. The highest level in a data consolidation path is referred to as that data's dimension. A given data dimension represents a specific perspective of the data included in its associated consolidation path. There are typically a number of different dimensions from which a given pool of data can be analyzed. This plural perspective, or Multi-Dimensional Conceptual View, appears to be the way most business persons naturally view their enterprise. Each of these perspectives is considered to be a complementary data dimension. Simultaneous analysis of multiple data dimensions is referred to as multi-dimensional data analysis.

OLAP functionality is characterized by dynamic multi-dimensional analysis of consolidated data supporting end user analytical and navigational activities including:
  calculations and modeling applied across dimensions, through hierarchies and/or across members;
  trend analysis over sequential time periods;
  slicing subsets for on-screen viewing;
  drill-down to deeper levels of consolidation;
  reach-through to underlying detail data; and
  rotation to new dimensional comparisons in the viewing area.

OLAP is often implemented in a multi-user client/server mode and attempts to offer consistently rapid response to database access, regardless of database size and complexity.

Multi-dimensional databases provide a means for business analysts to easily view summary data and other derived data in a multi-dimensional model of a business. Such a model can be used to test whether a particular hypothesis about the operation of the business is true or not. However, such models can be very large and so it can be difficult to "see" where the most interesting "features" are in a vast numeric landscape comprising millions, or even billions of values. That is, a multi-dimensional OLAP system has multiple dimensions and members within the dimensions. It is typically difficult and time-consuming to locate particular data within the multi-dimensional OLAP system.

One conventional system is described in U.S. Pat. No. 5,359,724 (hereinafter the '724 patent), issued on Oct. 25, 1994 to Robert J. Earle, and entitled "Method and Apparatus for Storing and Retrieving Multi-Dimensional Data in Computer Memory". Multi-dimensional data is organized as sparse and dense dimensions in a two level structure. In particular, the dense dimensions form a block of data having cells, with each cell holding a value for a combination of sparse dimensions. This technique requires a user to specify a combination of sparse dimensions to access the multi-dimensional data. This places a burden on the user to know the sparse dimensions and the combination required to access a value in a cell. It also is time consuming for a user to use this technique to access data in many cells.

Sunita Sarawagi in "Indexing OLAP Data", Bulletin of the IEEE Computer Society Technical Committee on Data Engineering, 1996, prototyped a system for coloring cells in a Microsoft® Excel pivot table and devised a scheme to lead an analyst from high-level cells to lower-level cells of interest, however, no mechanism for integrating this technology with multi-dimensional databases was devised. Furthermore, the navigation process described was tedious, particularly in large cubes, and required the user to navigate to each cell and view the feature subjectively.

There is a need in the art for an improved technique for accessing data in a multi-dimensional database.

SUMMARY OF THE INVENTION

To overcome the limitations in the prior art described above, and to overcome other limitations that will become apparent upon reading and understanding the present specification, the present invention discloses a method, apparatus, and article of manufacture for using an index to access a subject multi-dimensional database.

According to an embodiment of the invention, a subject multi-dimensional database stored on a data store connected to the computer is accessed. Initially, an index is created for the subject multi-dimensional database, wherein the index comprises another multi-dimensional database. Then, the subject multi-dimensional database is accessed using the index.

BRIEF DESCRIPTION OF THE DRAWINGS

Referring now to the drawings in which like reference numbers represent corresponding parts throughout:

FIG. 9B is a login prompt for connecting to an index;

FIG. 10 is a graphical user interface (GUI) for a Partition Wizard;

FIG. 11 is a graphical user interface used to generate an area mapping;

FIG. 12 is a graphical user interface used to generate member mappings;

FIG. 14 is a dialog window that shows a link to a subject multi-dimensional database;

FIG. 17 is a flow diagram illustrating a process of navigating an index.

DETAILED DESCRIPTION OF AN EMBODIMENT

Figure 1:
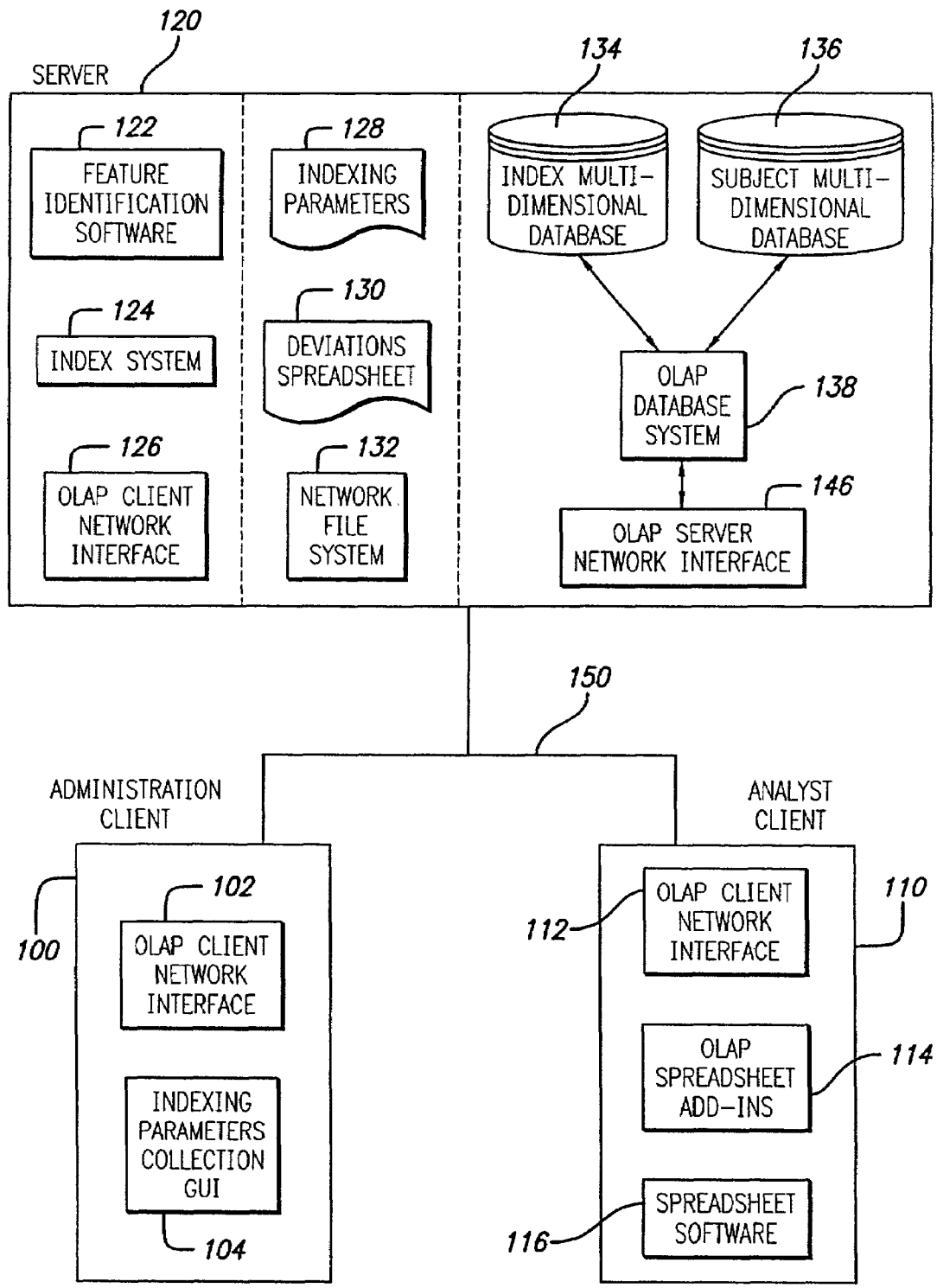
FIG. 1 is a block diagram illustrating components of a hardware environment.

In the following description of an embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

An embodiment of the invention builds an index for accessing a multi-dimensional database. The index is itself a multi-dimensional database. To more easily distinguish between the databases, the multi-dimensional database to be accessed will be referred to as a subject multi-dimensional database, and the index will be referred to as an index or an index multi-dimensional database. The techniques of the invention are applicable to all multi-dimensional databases with the following characteristics: (1) the ability to store data and associated non-numeric values; and (2) the ability to link from a database of one dimensionality to a database of another dimensionality. Additionally, if a multi-dimensional database did not have an ability to store data and associated non-numeric values and/or an ability to link from a database of one dimensionality to a database of another dimensionality, the techniques of the invention may still be applied in alternative embodiments in which these functions are added as part of as an application, instead of as part of a multi-dimensional database system.

The invention provides a user interface to set up definitions for the subject multi-dimensional database to be mined, dimensions to be mined, measures to be mined, mining technique (i.e., feature identification) parameters, and the number of results to be stored. The user interface is able to directly drive a mining run. Additionally, the Invention supports traversal of the multi-dimensional database, execution of the mining technique, and generation of result data. The mining can be carried out following incremental data load and calculation when the invention runs in batch mode. In one embodiment, the mining technique scans the subject multi-dimensional database only once. The result data is used to create an index. Management of the index requires operations for creating and deleting the index, for outline definition, for data population, for cell note creation (i.e., linked reporting object creation), and linked partition definition. The invention provides capabilities for exploration and visualization of the result data against the subject multi-dimensional database.

In particular, the invention provides integration between OLAP and data mining by providing a deviation detection feature that explores OLAP data and guides an analyst to deviant values. OLAP usually involves a person exploring the data, formulating questions and finding answers. The invention extends OLAP to perform automated exploration of the data.

The invention uses an index (i.e., a second multi-dimensional database) to access a first or subject multi-dimensional database. The invention automatically builds the index, along with links to the subject multi-dimensional database. The invention also stores the index data in a spreadsheet data file, so that a spreadsheet user could view a list of deviations in one spreadsheet and link to the cells in the subject multi-dimensional database using a linked partition mechanism. Moreover, this invention supports use of linked reporting objects (LROs) and provides a report that can be loaded into a spreadsheet.

There are many advantages to the invention. For example, the invention has a straightforward implementation. Also, the invention does not require any additional functions or support from the developers of the subject multi-dimensional database, does not modify the existing subject multi-dimensional database, and does not store extra data in the subject multi-dimensional database. Moreover, the invention can store extra explanations as cell notes on the index. Additionally, the invention provides visualization and navigation of multi-dimensional data. Furthermore, the invention can be managed easily and can be applied with any data mining technique that can identify points of interests in a multi-dimensional database (i.e., a feature identification technique). In addition, the infrastructure of the invention supports plug-in techniques the can extend the solution beyond deviation detection.

Hardware Environment

FIG. 1 is a block diagram illustrating components of a hardware environment. The components work together to build an index to a multi-dimensional database, with the index itself being another multi-dimensional database.

In particular, an Administration Client 100, an Analyst Client 110, and a Server 120 are connected to each other via a network 150, such as a LAN, WAN, or the Internet. Initially, an administrator or other user at an administration client 100 locates an Indexing Parameters Collection GUI 104 using a Network File System 132. Then, the administrator runs (i.e., invokes or executes) the Indexing Parameters Collection GUI (i.e., graphical user interface) 104. The Indexing Parameters Collection GUI 104 collects parameters to be used to create an Index Multi-Dimensional Database (i.e., index) 134 to access a Subject Multi-Dimensional Database 136. During the process of collecting parameters, the Indexing Parameters Collection GUI 104 uses the OLAP Client Network Interface 102 to interface with the OLAP Server Network Interface 146, which in turn interfaces with the OLAP Database System 138 in order to access the Subject Multi-Dimensional Database 136 and return data to the Indexing Parameters Collection GUI 104 via the OLAP Server Network Interface 146 and the OLAP Client Network Interface 102. The Indexing Parameters Collection GUI 104 creates an Indexing Parameters file 128.

Next, the Index System 124 is invoked by the Indexing Parameters Collection GUI 104. Then, the Index System 124 invokes Feature Identification Software 122 and passes the Indexing Parameters file 128 to the Feature Identification Software 122. The Feature Identification Software 122 performs data mining to obtain a specified number of deviations for one or more members of the Subject Multi-Dimensional Database 136. In particular, the Feature Identification Software 122 retrieves data from the Subject Multi-Dimensional Database 136. The Feature Identification Software 122 accesses the Subject Multi-Dimensional Database 136 via an OLAP Client Network Interface 126 to interface with the OLAP Server Network Interface 146, which in turn interfaces with the OLAP Database System 138 in order to access the Subject Multi-Dimensional Database 136 and return data to the Feature Identification Software 122 via the OLAP Server Network Interface 146 and the OLAP Client Network Interface 126.

The Feature Identification Software 122 returns data to the Index System 124, which uses the returned data to create an Index Multi-Dimensional Database 134. Using the Index Multi-Dimensional Database 134, the Index System 124 creates the Deviations Spreadsheet 130.

Once the Deviations Spreadsheet 130 has been built, the Index System 124 provides capabilities for using the Deviations Spreadsheet 130 to access the Subject Multi-Dimensional Database 136. In particular, an analyst or user at the Analyst Client 110 uses the Network File System 132 to locate and select the Deviations Spreadsheet 130. Selection of the Deviations Spreadsheet 130 may be done, for example, by pointing at the Deviations Spreadsheet 130 with a mouse and double-clicking a left mouse button. Selection of the Deviations Spreadsheet 130 invokes the Spreadsheet Software 116, which in turn invokes the OLAP Spreadsheet Add-In 114.

Then, the Spreadsheet Software 116 and OLAP Spreadsheet Add-In 114 access the Subject Multi-Dimensional Database 136 via an OLAP Client Network Interface 112 to interface with the OLAP Server Network Interface 146, which in turn interfaces with the OLAP Database System 138 in order to access the Subject Multi-Dimensional Database 136 and return data to the Index System 124 via the OLAP Server Network Interface 146 and the OLAP Client Network Interface 112.

In the hardware environment, the Administration Client 100, Analyst Client 110, and Server 120 may each include, inter alia, a processor, memory, keyboard, or display, and may be connected locally or remotely to fixed and/or removable data storage devices and/or data communications devices. The Administration Client 100, Analyst Client 110, and Server 120 also could be connected to other computer systems via the data communications devices. Those skilled in the art will recognize that any combination of the above components, or any number of different components, peripherals, and other devices, may be used with the Administration Client 100, Analyst Client 110, and Server 120. Those skilled in the art will also recognize that the present invention may be implemented on a single computer, rather than multiple computers networked together.

The present invention is typically implemented using one or more computer programs, each of which executes under the control of an operating system and causes the Administration Client 100, Analyst Client 110, and Server 120 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the Administration Client 100, Analyst Client 110, and Server 120, cause the Administration Client 100, Analyst Client 110, and Server 120 to perform the steps necessary to implement and/or use the present invention. Under control of the operating system, the computer programs may be loaded from the memory, data storage devices, and/or data communications devices into the memories of the Administration Client 100, Analyst Client 110, and Server 120 for use during actual operations. Those skilled in the art will recognize many modifications may be made to this configuration without departing from the scope of the present invention.

The present invention comprises an OLAP system that is designed for a wide-range of multi-dimensional reporting and analysis applications. In one embodiment, the OLAP system is based on Hyperion® Software's Essbase® OLAP software. The present invention utilizes a number of components from the Essbase® OLAP system, including components that provide data access, navigation, application design and management and data calculation. However, the present invention comprises new elements that allow access to a multi-dimensional database via an index.

Those skilled in the art will recognize that the hardware environment illustrated in FIG. 1 is not intended to limit the present invention. Indeed, those skilled in the art will recognize that other alternative hardware environments may be used without departing from the scope of the present invention.

Conceptual Structure of the Multi-dimensional Database

Figure 2:
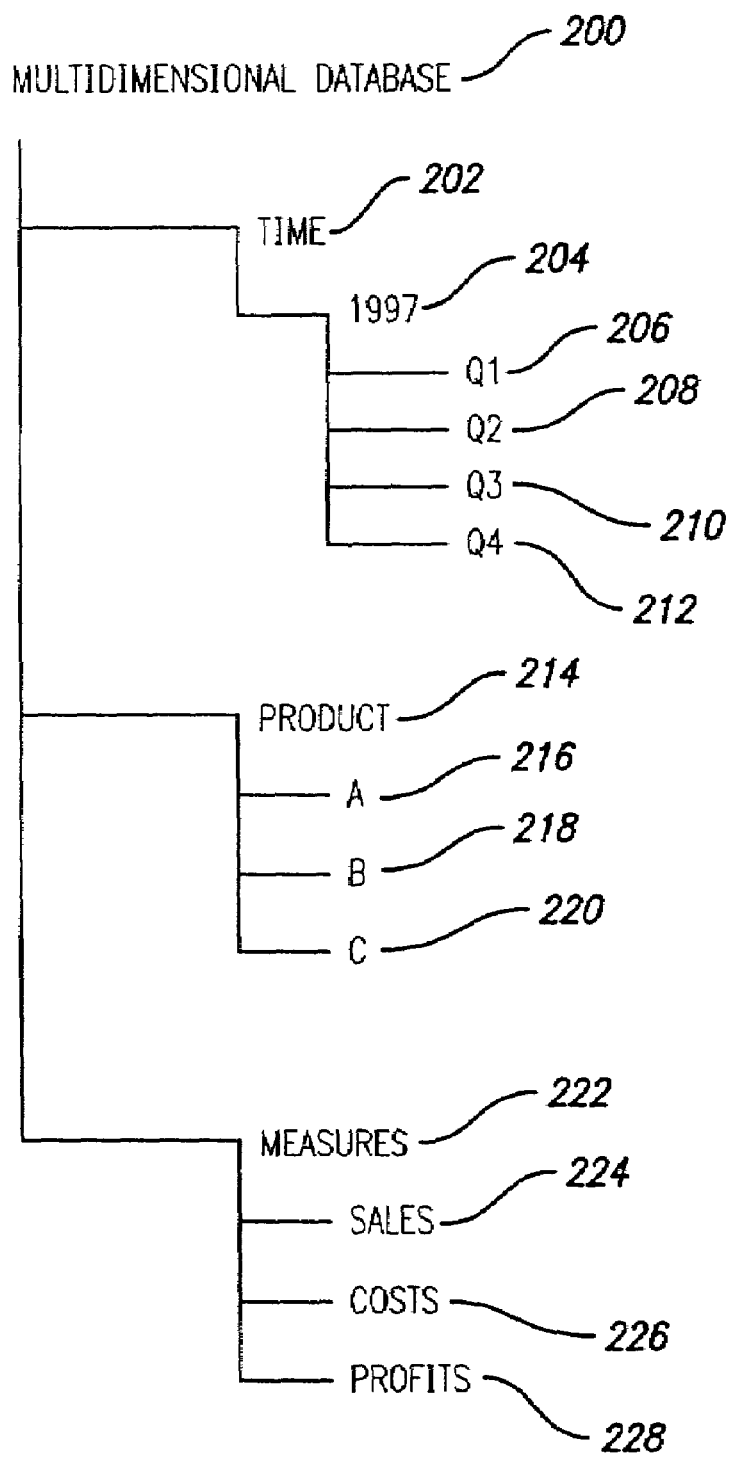
FIG. 2 is a diagram that illustrates a conceptual structure (i.e., an outline) of a multi-dimensional database.

FIG. 2 is a diagram that illustrates a conceptual structure (i.e., an outline) 200 of a multi-dimensional database. A dimension 202, 214, or 222 is a structural attribute that is a list of members, all of which are of a similar type in the user's perception of the data. For example, the year 1997 204 and all quarters, Q1 206, Q2 208, Q3 210, and Q4 212, are members of the Time dimension 202. Moreover, each dimension 202, 214, or 222 is itself considered a member of the multi-dimensional database 200.

Logical Structure of the Multi-dimensional Database

Figure 3:
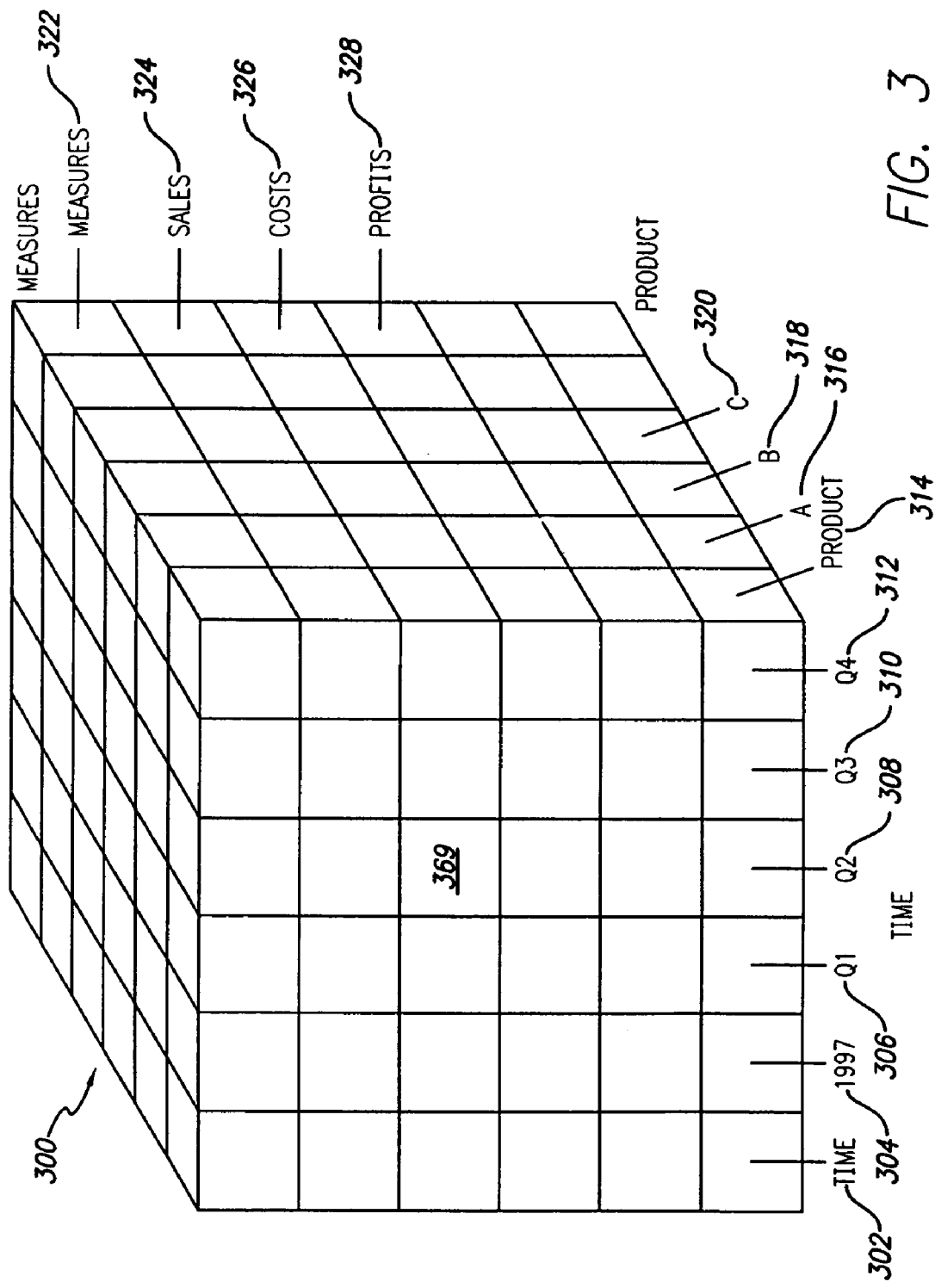
FIG. 3 is a diagram that illustrates a logical structure of a multi-dimensional database.

FIG. 3 is a diagram that illustrates a logical structure of a multi-dimensional database 300. Generally, the multi-dimensional database 300 is arranged as a multi-dimensional array, so that every data item is located and accessed based on the intersection of the members which define that item. The array comprises a group of data cells arranged by the dimensions of the data. For example, a spreadsheet exemplifies a two-dimensional array with the data cells arranged in rows and columns, each being a dimension. A three-dimensional array can be visualized as a cube with each dimension forming an edge. Higher dimensional arrays (also known as Cubes or Hypercubes) have no physical metaphor, but they organize the data in a way desired by the users.

A dimension acts as an index for identifying values within the Cube. If one member of the dimension is selected, then the remaining dimensions in which a range of members (or all members) are selected defines a sub-cube in which the number of dimensions is reduced by one. If all but two dimensions have a single member selected, the remaining two dimensions define a spreadsheet (or a "slice" or a "page"). If all dimensions have a single member selected, then a single cell is defined. Dimensions offer a very concise, intuitive way of organizing and selecting data for retrieval, exploration and analysis.

A single data point or cell occurs at the intersection defined by selecting one member from each dimension in a cube. In the example cube shown in FIG. 3, the dimensions are Time, Product, and Measures. The cube is three dimensional, with each dimension (i.e., Time, Product, and Measures) represented by an axis of the cube. The intersection of the dimension members (i.e., Time 302, 1997 304, Q1 306, Q2 308, Q3 310, Q4 312, Product 314, A 316, B 318, C 320, Measures 322, Sales 324, Costs 326, and Profits 328) are represented by cells in the multi-dimensional database that specify a precise intersection along all dimensions that uniquely identifies a single data point. For example, the intersection of Q2 308, Product 314 and Costs 326 contains the value, 369, representing the costs of all products in the second quarter of 1997.

Cubes generally have hierarchies or formula-based relationships of data within each dimension. Consolidation involves computing all of these data relationships for one or more dimensions. An example of consolidation is adding up all sales in the first quarter. While such relationships are normally summations, any type of computational relationship or formula might be defined.

Members of a dimension are included in a calculation to produce a consolidated total for a parent member. Children may themselves be consolidated levels, which requires that they have children. A member may be a child for more than one parent, and a child's multiple parents may not necessarily be at the same hierarchical level, thereby allowing complex, multiple hierarchical aggregations within any dimension.

Drilling down or up is a specific analytical technique whereby the user navigates among levels of data ranging from the most summarized (up) to the most detailed (down). The drilling paths may be defined by the hierarchies within dimensions or other relationships that may be dynamic within or between dimensions. For example, when viewing data for Sales 324 for the year 1997 304 in FIG. 3, a drill-down operation in the Time dimension 302 would then display members Q1 306, Q2 308, Q3 310, and Q4 312.

Accessing Multi-Dimensional Data Via Sparse Dimensions

In particular, U.S. Pat. No. 5,359,724 (hereinafter the '724 patent), issued on Oct. 25, 1994 to Robert J. Earle, and entitled "Method and Apparatus for Storing and Retrieving Multi-Dimensional Data in Computer Memory" describes a technique for accessing data via a combination of members of the multi-dimensional database. The '724 patent addresses sparsity for large arrays with many dimensions. The dimensions are split into two groups: sparse dimensions from the outer array and dense dimensions form the inner array. Each cell in the outer (sparse) array contains a dense array. A user chooses dimension types so that sparsity occurs in the outer array.

Figure 4:
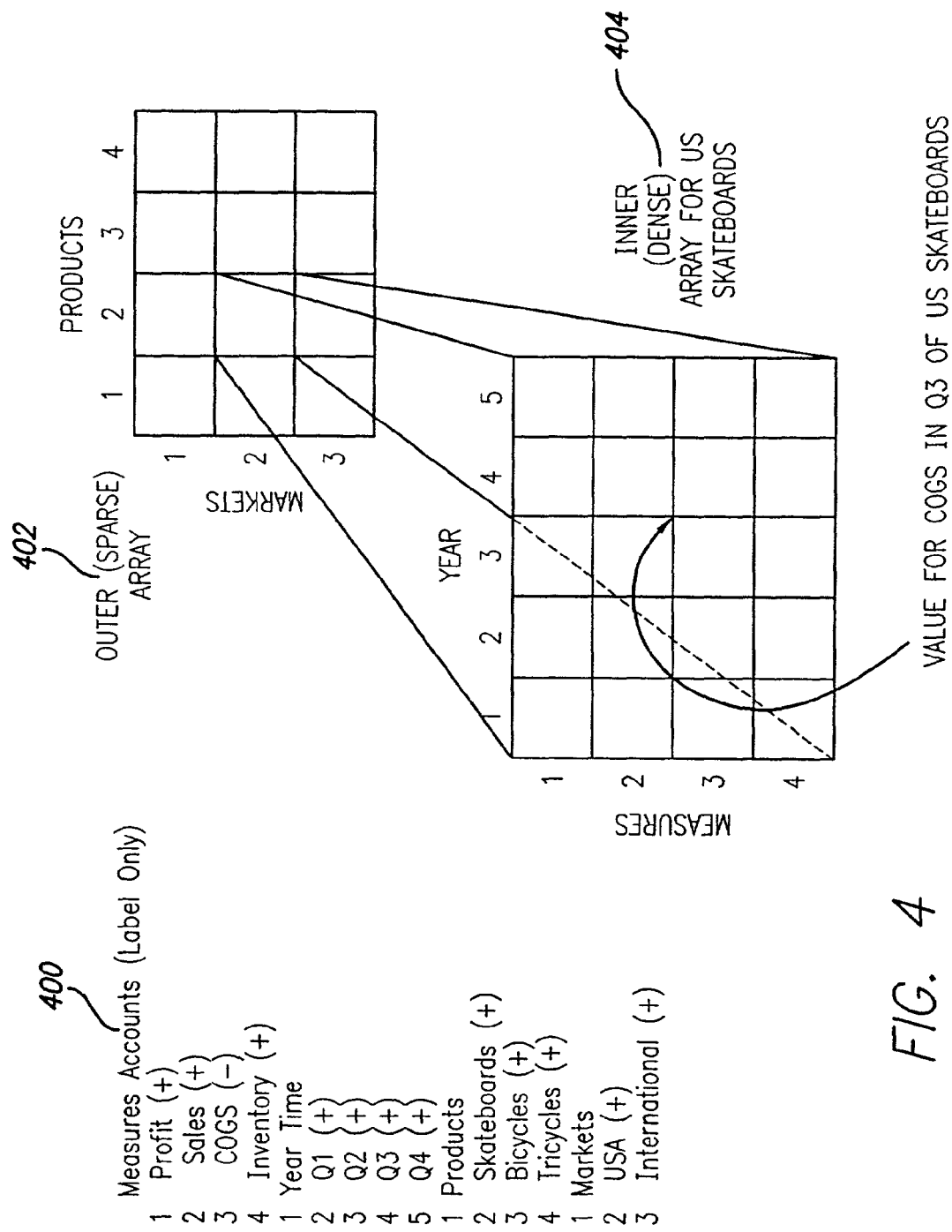
FIG. 4 is a diagram that illustrates a conceptual structure (i.e., an outline) of a multi-dimensional database having an outer (sparse) array and an inner (dense) array.

FIG. 4 is a diagram that illustrates a conceptual structure (i.e., an outline) 400 of a multi-dimensional database having an outer (sparse) array 402 and an inner (dense) array 404. The outline 400 has the following dimensions: Measures, Year, Products, and Markets. Each of the members of the outline 400 has an associated number, referred to as a sparse member identifier. Skateboards is a member of the Products dimension, USA is a member of the Markets dimension, and COGS is a member of Profit, which is a member of the Measures dimension. The inner (dense) array 404 is for US Skateboards, and a cell in this array holds, for example, a value for COGS in Q3 (i.e., quarter 3) of US Skateboards.

Figure 5:
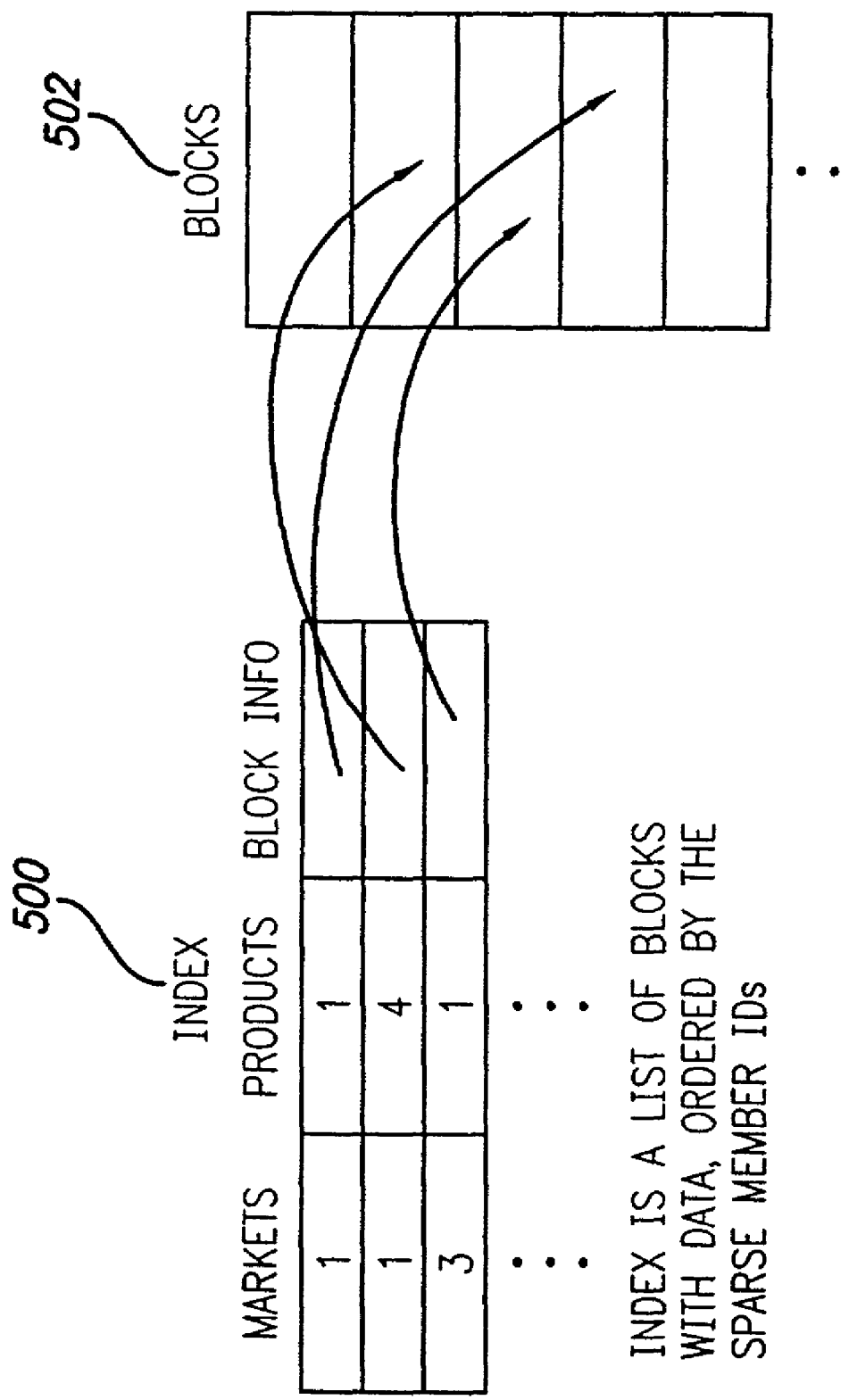
FIG. 5 is a diagram illustrating an index used to access multi-dimensional data.

FIG. 5 is a diagram illustrating an index 500 used to access multi-dimensional data 502. In particular, the index 500 is a list of blocks with data, ordered by the sparse member identifiers. A combination of sparse member identifiers is an index to a particular dense data block 502.

The '724 patent allows efficient access to a multi-dimensional database via member names, but not based on cell values. On the other hand, the invention described in this embodiment is advantageous in that it enables access to a database having characteristics similar to the database of the '724 patent based on cell values.

Note that the cells of the multi-dimensional database of the '724 patent only hold numeric values. A linked reporting object (LRO) enables non-numeric data to be associated with a cell. The linked reporting object is not stored in the main database. Additionally, the linked reporting object has a different indexing technique.

Using an Index to Access a Subject Multi-Dimensional Database

In order to create the index, the Index System 124 passes the indexing parameters 128 to feature identification software 122 for use in finding "features" in the subject multi-dimensional database 136. Then, the Index System finds the "features" with the feature identification software 122. Next, the Index System builds the index 134 using the features as points for indexing into the subject multi-dimensional database 136. Then, the Index System 124 provides navigation capabilities for navigating the index 134 to access the subject multi-dimensional database 136. The following discussion will use examples to better illustrate the concepts of the invention. Although the following examples discuss using one index to access one subject multi-dimensional database, one or more indexes may be created and used to access one or more subject multi-dimensional databases.

Figure 6:
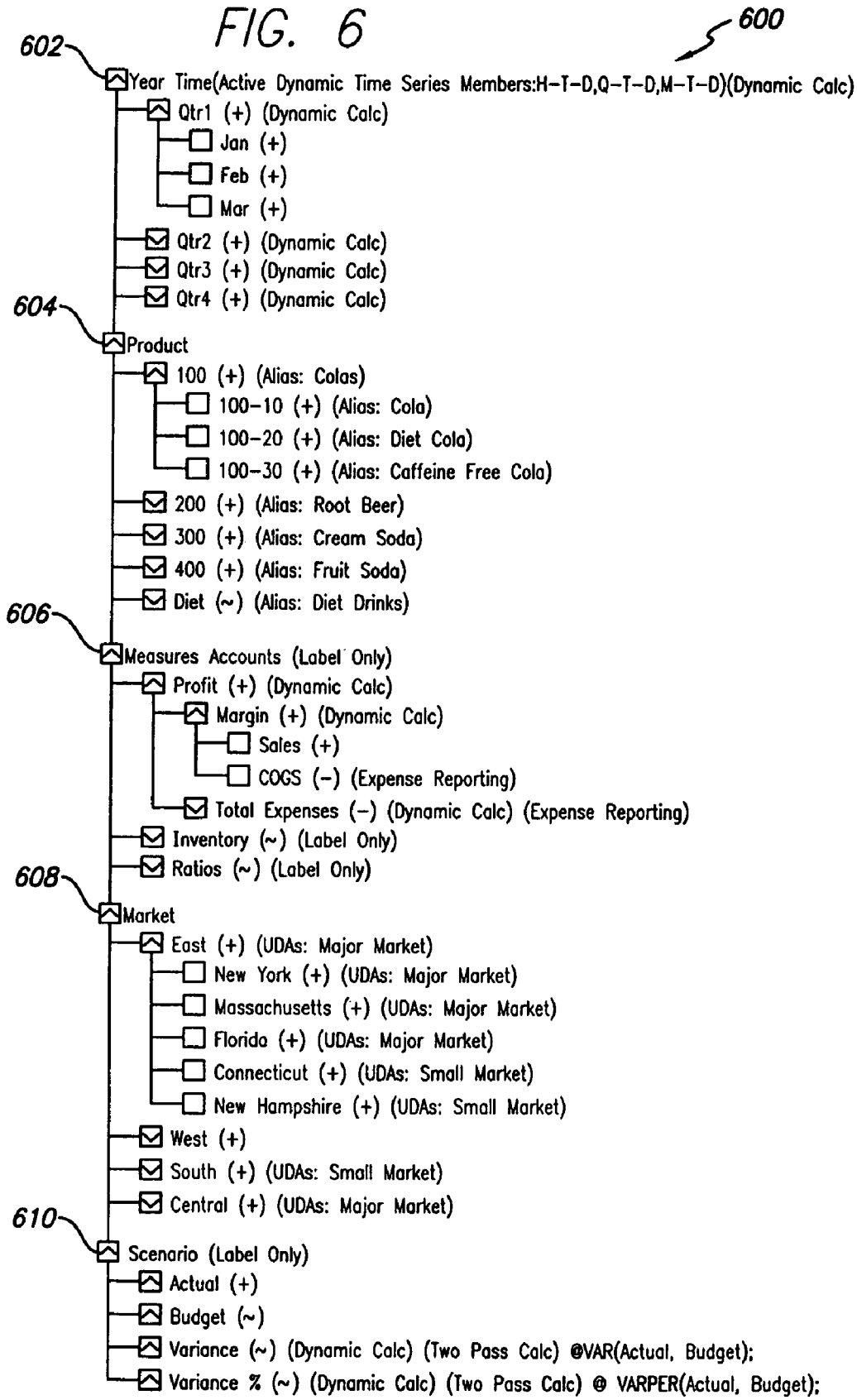
FIG. 6 is a diagram that illustrates a conceptual structure (i.e., an outline) of a subject multi-dimensional database.

Initially, a subject multi-dimensional database exists or is created. The subject multi-dimensional database has an outline that defines the members and hierarchies that form its dimensions. The subject multi-dimensional database stores values in the cells of the multi-dimensional structure defined by the outline. FIG. 6 is a diagram that illustrates a conceptual structure (i.e., an outline) 600 of a subject multi-dimensional database. The outline 600 has the following dimensions: Year 602, Product 604, Measures 606, Market 608, and Scenario 610. The Measures 606 and Scenario 610 dimensions have associated text indicating that they are only labels. That is, there is no data associated with just the Measures 606 and Scenario 610 dimensions, but these dimension labels are used to categorize other data, which is associated with the members of these dimensions. For dimensions, such as Product 604 and Market 608, it is possible to drill down to members or to drill up to the dimension to obtain a summary or calculation of collective data from the members.

The Index System provides a user interface to gather parameters for the feature identification phase. In one embodiment, parameters collected include the following:

Subject Multi-Dimensional Database parameters:
   server, application, database, username, password
Index parameters: server, application, database, username, password
Scope parameter
Member(s) parameter
Feature Identification Technique parameter
Limit parameter The Subject Multi-Dimensional Database parameters are used to collect information on the location and identification of the subject multi-dimensional database. Additionally, a username (i.e., user identification) and password are requested for use in accessing a secure subject multi-dimensional database. The Index parameters are used to collect information on the location and identification of the index. A username (i.e., user identification) and password are requested for use in securing the index. The Scope parameter is used to collect information about which member or members of each dimension (i.e., member sets for each dimension) are to be used for a deviation search when performing feature identification. Additionally, the Member(s) parameter is used to collect information on which feature or features are to be mined. The Member(s) parameter is a special part of the Scope parameter. The Feature Identification Technique parameter is used to collect information on which particular feature identification technique is to be used and additional parameter information for that technique. Note that there are many feature identification techniques known in the art. The Limit parameter is used to collect a limit on the number of features to locate using the feature identification technique. For the selected number of features, the invention stores deviation values, dimensional intersection identifiers, and explanation information. Typically, an analyst looking at deviations will look at a relatively small number of deviations. Because a limit on the amount of data that is expected from the feature identification software is provided, the feature identification software typically can accumulate its results in memory, without a need for writing the results to disk.

Once parameter information is collected, the Index System launches feature identification software, which connects to the subject multi-dimensional database, extracts the data specified by the scope, and passes it on to the feature identification software.

In the following example, the object will be to obtain the three most prominent features. Therefore, the Limit parameter is set to three. In this example, the Scope parameter contains the following values:

| Dimension | Members |
|---|---|
| Measures | Sales |
| Year | All Members |
| Product | All Members |
| Market | All Members |
| Scenario | Actual |

For the Measures dimension 606, the scope is the Sales member. For the Year dimension 602, the scope is all members. For the Product dimension 604, the scope is all members. For the Market dimension 608, the scope is all members. For the Scenario dimension 610, the scope is the Actual member. The Index System obtains these parameters and forwards the parameters to feature identification software, which retrieves the data for the members specified by the scope. This data is passed on to the feature identification software.

In this example, the Member(s) parameter is Measures, and the feature identification software will determine Sales deviation. For the selected Measures member, the feature identification software, calculates the three most prominent features. The feature identification software may use any technique that can identify specific points or regions of interest in a multi-dimensional database. The result is an ordered list of multi-dimensional points. Some feature identification techniques may have additional information about features, such as the dimension along which the feature is most apparent. This additional information can be attached to the value data for the points in linked report objects (LROs). In this example, the Feature Identification Technique parameter will identify the deviation detection technique as described by Sunita Sarawagi, Rakesh Agrawal, and Nimrod Megiddo in "Discover-driven Exploration of OLAP Data Cubes", Research Report, IBM Research Division, which is incorporated by reference herein.

For the parameters specified above, the following table illustrates data that is returned by the feature identification technique. In particular, the data returned lists the top three deviations for the Sales member.

| Rank | Year | Product | Market | Deviation |
|---|---|---|---|---|
| 1 | Jan | 100-10 | Florida | 0.06 |
| 2 | Qtr2 | Product | Utah | 0.03 |
| 3 | Nov | 400-10 | Market | 0.02 |

This retrieved data is stored in a spreadsheet data file by the Index System. In one embodiment, the spreadsheet data file is a comma separated values (.CSV) file. The following illustrates a spreadsheet data file that the Index System outputs for this example:

| "Scenario" | , "Market"  | , "Product" | , "Year" | , "Rank"   | , "Measures" |
|------------|-------------|-------------|----------|------------|--------------|
|            | ,           | ,           | ,        | ,          | , 0          |
| "Actual"   | , "Florida" | , "100-10"  | , "Jan"  | , "Rank 1" | , 0.06       |
| "Actual"   | , "Utah"    | , "Product" | , "Qtr2" | , "Rank 2" | , 0.03       |
| "Actual"   | , "Market"  | , "400-10"  | , "Nov"  | , "Rank 3" | , 0.02       |

The first row has blanks for all fields, except Measures, and is the top level (i.e., apex) point in the multi-dimensional database. No deviation data is associated with this point in the index. This point is included in the spreadsheet to allow a user to view the indexing parameters, which are stored in a linked reporting object associated with this cell. The second row has the dimension names for all dimensions, other than the one (i.e., the Measures dimension) whose member (i.e., Sales) is to be mined. A zero ("0") is placed in the column for the Measures dimension in the second row.

In each row, the first data element refers to the Actual member of the Scenario dimension 610, the second data element refers to a member of the Market dimension 608 (note that a dimension itself is a "member"), the third data element refers to a member of the Product dimension 604, the fourth data element refers to a member of the Year dimension 602, the fifth data element refers to a Rank value, and the sixth data element is the deviation value for the associated Sales member of the subject database.

The Index System uses the ordered list of points to build a multi-dimensional database that serves as an index of the points of interest in the subject multi-dimensional database.

Figures 7, 8, 9A:
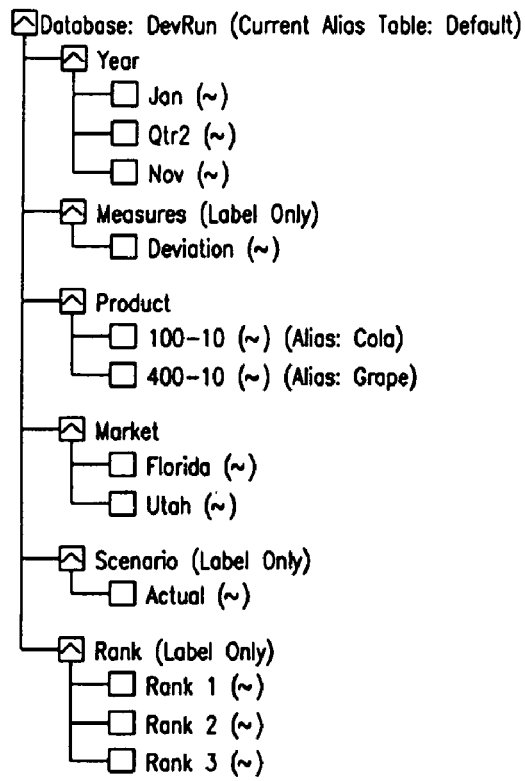
FIG. 7 is a diagram that illustrates a conceptual structure (i.e., an outline) of an index.
FIG. 8 is a spreadsheet that reflects data in the index.
FIG. 9A is a spreadsheet that captures information of an index via a spreadsheet data file.

FIG. 7 is a diagram that illustrates a conceptual structure (i.e., an outline) 700 of an index. The dimensions of the index 700 are the same as the subject multi-dimensional database, with an additional dimension, Rank. The name Rank is used only as an example. It is to be noted that due to multi-dimensional member naming rules, this name may not be available and another would be used. In an alternative embodiment, the name of this dimension is another parameter gathered by the user interface software. Members of the Rank dimension are simply Rank 1, Rank 2, etc. (subject to naming restrictions).

The dimensions other than Rank contain only members in the union of all members from the list of most prominent features. So, if the top N features are requested, each of the resulting dimensions in the index has, at most, N+1 members. For example, looking at the ordered list of points in the spreadsheet data file above, the Scenario dimension 610 has two members: "Scenario" and "Actual", and has these two members in the index. This is due to the fact that the index has the same dimensions as the subject multi-dimensional database, and the data elements in the first row of the ordered list of points in the spreadsheet data file reference the dimension. In the index, the Market dimension 608 has three members: "Florida", "Utah", and "Market". In the index, the Product dimension 604 has three members: "100-10", "Product", and "400-10". In the index, the Year dimension 602 has members: "Year", "Jan", Qtr2", and "Nov", which is N+1 (i.e., 3+1=4) members. In the index, the Measures dimension 606 has members "Measures" and "Deviation". "Deviation" is a member of the Measures dimension 606 because the deviation detection technique calculated a Sales deviation in this example. That is, the Measures dimension 606 has a member, which is the member specified as the measured item (i.e., Sales) in the input.

These are flat dimensions, and it is not necessary to include the hierarchical structure of the subject multi-dimensional database in the index. The index is extremely sparse, with only N cells containing data. In the definition of the storage arrangement for the index, all dimensions should be sparse.

The Index System uses standard application programming interfaces (APIs) provided with a multi-dimensional database system (e.g., system software such as Essbase® software) to connect to an instance of the multi-dimensional database system and construct the index. Initially, the Index System uses the feature report (i.e., the ordered list of points) to load the feature values into the cells of the index. If the feature identification technique provides descriptive information, it is loaded as Linked Reporting Objects (LROs) associated with corresponding feature-value cells. The input parameters of the feature identification operation that generated the index are stored as an LRO at the top-level cell (Year, Measures, Product, Market, Scenario, Rank) of the index.

FIG. 8 is a spreadsheet 800 that reflects data in the index. In particular, the spreadsheet 800 shows the three cells in the index reflecting the top three selected Sales deviation values. That is, the spreadsheet 800 comprises a dense view of data from the index multi-dimensional database. However, it is very difficult for a user to navigate to this view of the data. When drilling through each dimension with many missing values, a user may get confused. The resulting spreadsheet 800 is very sparse and it may be difficult for a user to find all of the values while searching for the deviations. This problem is solved by loading the spreadsheet data file into the spreadsheet, as illustrated by the spreadsheet shown in FIG. 9A.

FIG. 9A is a spreadsheet 900 that captures information of the index from a spreadsheet data file. The Sales member of the Measures dimension in row 902 has been selected for calculation deviations. Row 903 has the dimension names for all dimensions, other than for the Measures dimension, which has a zero ("0") in its column. Row 904 has data elements that correspond to the first row of the spreadsheet data file above. The menu bar has an Essbase menu 910 that may be selected to access OLAP spreadsheet add-ins 114. By navigating the spreadsheet 900, a user is able to access data in the subject multi-dimensional database using the index.

In particular, the Index System loads the N feature cell-values into the index. For example, in an embodiment using an Essbase® multi-dimensional database, a load-rule file is used to load index data from the spreadsheet data file shown above into the index data cells. A load-rule file is a file that describes the format of input that is to be loaded into an Essbase® multi-dimensional database. In an alternative embodiment, deviation values are formatted in a way that does not require use of a load-rule file, and, in fact, the deviation values may be stored in memory.

A query of the index in order of the Rank dimension members is generated in the form of a spreadsheet 900, which is illustrated in FIG. 9A. This is a standard form of multi-dimensional query. Spreadsheets such as Lotus® 1-2-3 spreadsheets and Microsoft® Excel spreadsheets could be generated, which may be useful particularly for formatting. In one embodiment, a comma separated values file is used as a spreadsheet data file, as shown above, because it is a simple text file that is understood by virtually all spreadsheet and database programs.

The first time a cell (e.g., cell F3) is selected in the spreadsheet 900, the invention displays a login prompt 920, as illustrated in FIG. 9B. In the login prompt 920, the analyst selects the index multi-dimensional database from, for example, a selection list, selects a server, and provides a username and password (i.e., these were Index parameters when building the index). This results in a connection to the index.

At this time, an index has been built and loaded with values. Next, the Index System automatically links the index to the subject multi-dimensional database. Again, the Index System uses standard APIs provided with the multi-dimensional database system (e.g., system software such as Essbase(®) software) to specify the linkage. FIGS. 10–12 illustrate graphical user interfaces to clarify the concepts of the process performed by the Index System. However, in one embodiment, these graphical user interfaces are not provided for a user, because the Index System performs the linking. In other embodiments, the graphical user interfaces are provided to enable a user to perform the linking.

FIG. 10 is a graphical user interface (GUI) for a Partition Wizard 1000. The Partition Wizard 1000 has a Connect tab 1002 with a Partition Type section 1004 in which a Linked radio button 1006 has been selected. Then, a Data Source 1008 identifies a source (i.e., the subject multi-dimensional database) to be linked to a target (i.e., the index), identified by Data Target 1010.

The linked Partition definition is very simple because the Index System maps each dimension in the subject multi-dimensional database to a dimension in the index. In particular, the Index System uses the partition definition to map the Deviation member in the index to the measure for which deviations were calculated, which is the Sales member in this case. Additionally, the Index System uses the partition definition to map out the Rank dimension because it is not a dimension of the subject multi-dimensional database.

FIG. 11 is a graphical user interface 1100 used to generate an area mapping. The Index System generates an area mapping to map out Rank when navigating to the subject multi-dimensional database. Area mapping refers to mapping an "area" or portion of the subject multi-dimensional database to the index. For example, @IDESCENDENTS("Year") from the subject multi-dimensional database is mapped to @IDESCENDENTS("Year")@IDESCENDENTS("Rank"). Note that IDESCENDENTS includes the specified members, such as Year and Rank, as well as the descendants (i.e., children, grandchildren, etc.) of the specified members. Therefore, one dimension of the subject multi-dimensional database is mapped to two dimensions of the index, which results in the Rank dimension of the index being mapped out.

FIG. 12 is a graphical user interface 1200 used to generate member mappings. Member mappings map the Rank dimension members to void and map the deviation value to the measure that has been mined. For example, the "Rank" dimension of the index is mapped to "void" 1202, while the "Sales" member of the subject multi-dimensional database is mapped to "Deviation" 1204 in the index.

Figure 13:
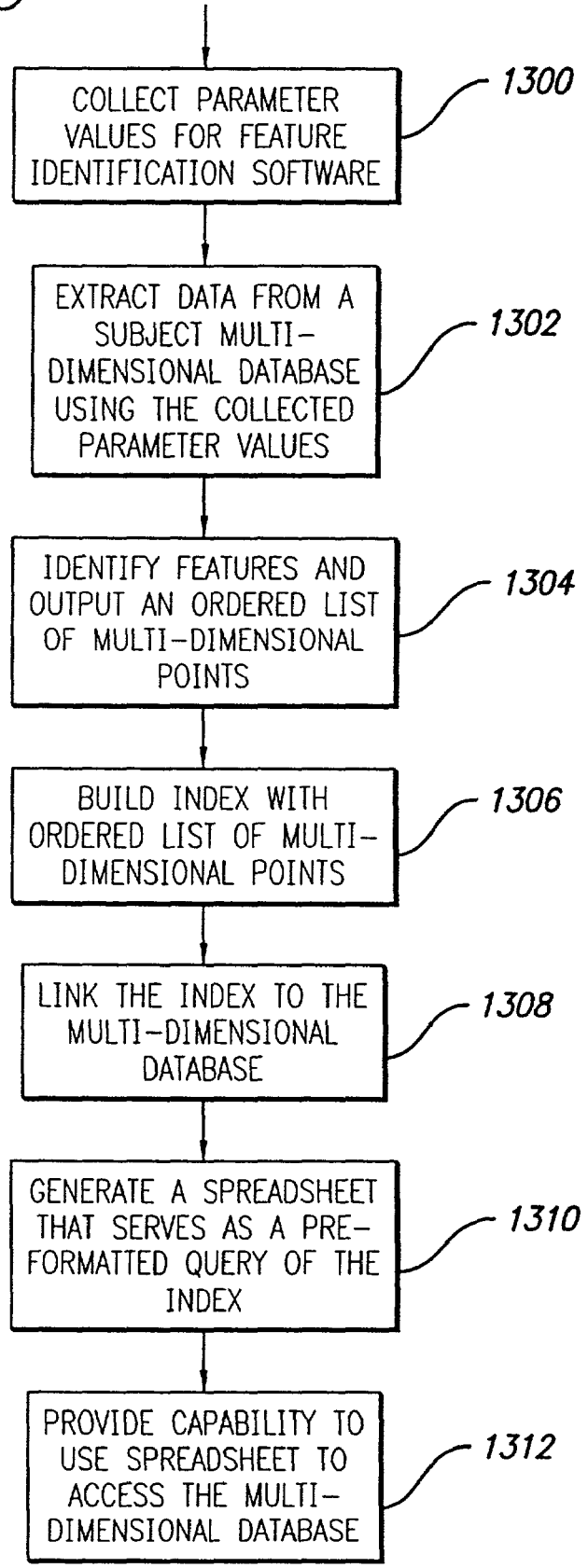
FIG. 13 is a flow diagram illustrating a process of building an index.

FIG. 13 is a flow diagram illustrating a process of building an index. In block 1300, the invention collects parameter values for feature identification. In block 1302, the invention extracts data from a subject multi-dimensional database using the collected parameter values. In block 1304, the invention identifies features and outputs an ordered list of multi-dimensional points. In block 1306, the invention builds an index with the ordered list of multi-dimensional points. In block 1308, the invention links the index to the multi-dimensional database. In block 1310, the invention generates a spreadsheet that serves as a pre-formatted query of the index. In block 1312, the invention provides the capability to use the spreadsheet to access the subject multi-dimensional database.

Navigating a Subject Multi-dimensional Database Using an Index

Once features are identified, the invention provides a navigation mechanism for accessing the subject multi-dimensional database using the index. The navigation mechanism has the following benefits:

It works naturally with multi-dimensional databases.

It shows an analyst feature points ranked by magnitude (as defined by the feature identification software).

It leads an analyst directly to cells of interest.

OLAP spreadsheet add-ins are used as a navigation tool for the subject multi-dimensional database. Add-ins refer to software programs that expand the capabilities of the spreadsheet, for example allowing zooming into or out of cells (i.e., which corresponds to drilling down and drilling up in a multi-dimensional database). For example, if the multi-dimensional spreadsheet is a Microsoft® Excel spreadsheet, the menu bar will include a new menu for the OLAP spreadsheet add-ins, which support navigating the index. This is advantageous in that it results in a simple, well-integrated interface designed for multi-dimensional analysts. The following process describes the elements required to navigate from a desktop (e.g., running on a Microsoft Windows NT® operating system) to a cell of interest in the index.

Initially, an analyst launches the spreadsheet containing the ranking query on the index. The loaded spreadsheet contains the ranked features, as shown in FIG. 9A. To navigate the subject multi-dimensional database, the analyst double-clicks on a feature-value cell of interest. The view presented in the spreadsheet 900 of FIG. 9A is a valid multi-dimensional report, so a user can connect to the index and view the linked reporting objects. The index is linked to the subject multi-dimensional database, which the deviation detection was run against, using a linked partition. The linked partition enables a user to navigate from the index view to an identified point in the subject multi-dimensional database by, for example, using a mouse and double-clicking a left mouse button while pointing at one of the deviation values.

As discussed above, the first time a cell is selected, the invention displays a login prompt. For example, double clicking on the Rank 1 deviation value (cell F3 in FIG. 9A) displays a login prompt 920, as shown in FIG. 9B. In the login prompt 920, the analyst selects the index multi-dimensional database from, for example, a selection list, selects a server, and provides a username and password (i.e., these were Index parameters when building the index). This results in a connection to the index.

Figures 15, 16:
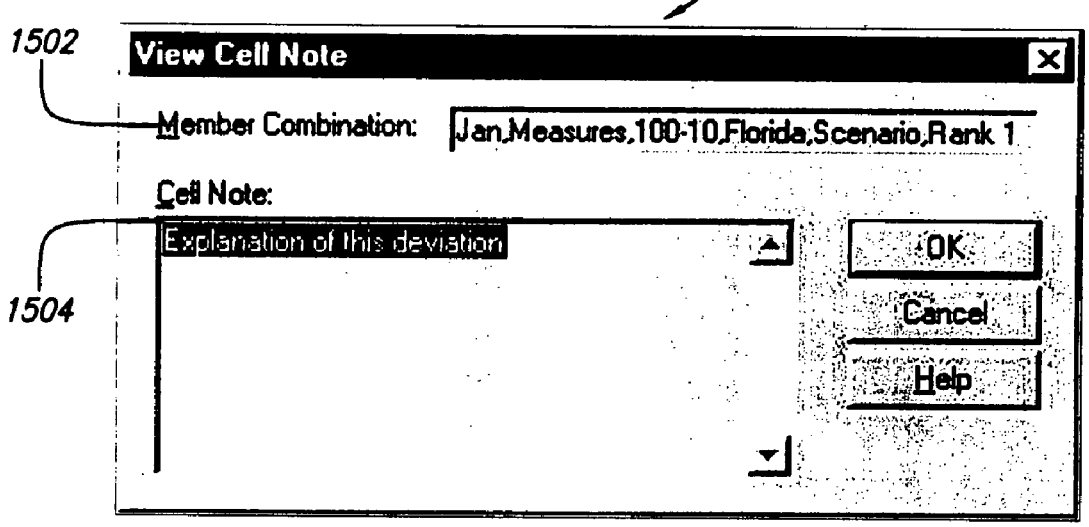
FIG. 15 illustrates a View Cell Note dialog window that enables a user to view an Explanation of the Deviation.
FIG. 16 is a spreadsheet that illustrates a point in a subject multi-dimensional database.

Next, selecting the cell again (e.g., double clicking on the Rank 1 deviation value (cell F3 in FIG. 9A), displays a link dialog window. FIG. 14 is a link dialog window 1400 that shows a link to a subject multi-dimensional database. When the connection to the index is established, the invention displays the dialog window 1400 that shows a link to the subject multi-dimensional database. If additional information was provided in an LRO, the dialog window will show that, too. For example, a Linked Partition 1402 can be selected to link to a subject multi-dimensional database or a Cell Note 1404 can be selected to access an Explanation of the Deviation. If the Cell Note 1404 is selected, a View Cell Note dialog window is displayed. FIG. 15 illustrates a View Cell Note dialog window 1500 that enables a user to view an Explanation of the Deviation. The dialog window 1500 displays a Member Combination 1502 and a Cell Note 1504.

If the analyst selects the link to the subject multi-dimensional database (e.g., by selecting the Linked Partition 1402 and selecting a View/Launch button), the invention opens a new spreadsheet with a query showing the point in the subject multi-dimensional database at which the feature was found.

FIG. 16 is a spreadsheet 1600 that illustrates a point in a subject multi-dimensional database. In particular, the value of 210 for the Actual member of the Scenario dimension 610 is shown for January sales of product "100-10" in Florida.

Next, the analyst uses the OLAP spreadsheet add-ins (e.g., zoom and pivot functions) to see the feature in a meaningful context. To see the deviation in context, the analyst can drill up and then drill down in one or more dimensions in order to view the deviation in a larger context.

FIG. 17 is a flow diagram illustrating a process of navigating an index. In block 1700, in response to user selection of a deviations spreadsheet, the invention launches spreadsheet software with OLAP spreadsheet add-ins. In block 1702, the invention displays a deviations spreadsheet with data from a spreadsheet data file, including ranking and deviation data. In block 1704, in response to user selection of a cell in the displayed deviations spreadsheet, the invention displays a login prompt. In block 1706, in response to user selection of an index and user input of a valid username and password, the invention connects to an index. In block 1708, the invention displays a link dialog window. In block 1710, in response to user selection of a linked partition, the invention displays the selected cell in the subject multi-dimensional database.

CONCLUSION

This concludes the description of one embodiment of the invention. The following describes some alternative embodiments for accomplishing the present invention. For example, any type of computer, such as a mainframe, minicomputer, or personal computer, or computer configuration, such as a time-sharing mainframe, local area network, or standalone personal computer, could be used with the present invention.

One alternative embodiment is to extend the subject multi-dimensional database with an extra dimension or extra measures to carry the results of the deviation detection. This embodiment would provide additional calculation functions and modification of the existing subject multi-dimensional database. Additionally, the embodiment would provide spreadsheet add-ins to support navigation and visualization of the results in the subject multi-dimensional database.

Yet another alternative embodiment is to write the results of the deviation detection as a report. This would not require modifications of an existing subject multi-dimensional database or additional functions.

A further embodiment uses linked reporting objects to flag cells of interest. This does not require modifications of an existing subject multi-dimensional database or additional functions. The linked reporting objects could store explanations, and the linked reporting objects on the top level member of the multi-dimensional database could store summary information for the deviation detection run, the parameters, and the results. The linked reporting objects would be dropped if an outline change took place. Additionally, the linked reporting objects would not use a rank ordering system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TRADEMARKS

IBM is a trademark or registered trademark of International Business Machines, Corporation in the United States and/or other countries.

Hyperion and Essbase are trademarks or registered trademarks of Hyperion Solutions Corporation in the United States and/or other countries.

Microsoft and Windows NT are trademarks or registered trademarks of Microsoft Corporation in the United States and/or other countries.

Note that Lotus is a trademark or registered trademark of Lotus Development Corporation in the United States and/or other countries.

What is claimed is:

1. A computer-implemented method of accessing a subject multi-dimensional database stored on a data store connected to a computer, comprising:
    receiving an indication of a number of features of said subject multi-dimensional database to be identified and an indication of a feature identification technique that finds points or regions of interest in the subject multi-dimensional database;
    performing feature identification to identify the indicated number of features using the indicated feature identification technique; and
    creating an index for the subject multi-dimensional database using the identified number of features, wherein creating the index comprises storing deviation values for each of the identified number of features, wherein creating the index comprises creating a multi-dimensional database that is derived from the subject multi-dimensional database.

2. The method of claim 1, wherein receiving the number of features to be identified comprises receiving a parameter value.

3. The method of claim 1, wherein performing feature identification comprises generating an ordered list or multi-dimensional points.

4. The method of claim 3, further comprising creating the index using the list of multi-dimensional points.

5. A computer-implemented method of accessing a subject multi-dimensional database stored on a data stare connected to a computer, comprising:
    receiving an indication of a number of features of said subject multi-dimensional database to be identified;
    performing feature identification to identi& the indicated number of features; and
    creating an index for the subject multi-dimensional database using the identified number of features, wherein the index comprises a second multi-dimensional database tat is derived from the subject multi-dimensional database, wherein creating the index comprises storing deviation values for each of the identified number of features.

6. The method of claim 5, wherein receiving the number of features to be identified comprises receiving a parameter value.

7. The method of claim 5, wherein performing feature identification comprises generating an ordered list of multi-dimensional points.

8. The method of claim 7, further comprising creating the index using the list of multi-dimensional points.

* * * * *